United States Patent [19]

Ishida et al.

[11] Patent Number: 5,782,965
[45] Date of Patent: Jul. 21, 1998

[54] INK FOR INK-JET DYEING AND METHOD OF FORMING MIXING COLOR

[75] Inventors: Ikue Ishida; Genichi Shirasaki; Makoto Iwamura; Yoshihiro Kanaya, all of Fukui-ken, Japan

[73] Assignee: Seiren Co., Ltd., Japan

[21] Appl. No.: 710,156

[22] Filed: Sep. 12, 1996

Related U.S. Application Data

[63] Continuation of Ser. No. 348,832, Nov. 29, 1994, abandoned.

Foreign Application Priority Data

Nov. 30, 1993 [JP] Japan ................. 5-329915

[51] Int. Cl.$^6$ ................................................ C09D 11/02
[52] U.S. Cl. ........................... 106/31.33; 106/31.27; 106/31.58; 106/31.59
[58] Field of Search ........................... 252/351, 353; 568/608, 309; 106/20 D, 31.33, 31.58, 31.59, 31.27

[56] References Cited

U.S. PATENT DOCUMENTS

| | | | |
|---|---|---|---|
| 2,843,568 | 7/1958 | Benning et al. | 568/608 |
| 3,558,557 | 1/1971 | Hrach et al. | 260/47 |
| 3,923,457 | 12/1975 | Ong et al. | 8/528 |
| 4,601,727 | 7/1986 | Nichols, Jr. | 8/477 |
| 5,049,188 | 9/1991 | Takimoto et al. | 106/20 |
| 5,104,575 | 4/1992 | King et al. | 252/351 |
| 5,205,861 | 4/1993 | Matrick | 106/20 D |

FOREIGN PATENT DOCUMENTS

| | | |
|---|---|---|
| 0525994 | 2/1993 | European Pat. Off. |
| 55-022013 | 2/1980 | Japan |
| 60-132947 | 7/1985 | Japan |
| 61-213273 | 9/1986 | Japan |
| 62-011780 | 1/1987 | Japan |
| 63-31594 | 6/1988 | Japan |
| 5-35740 | 5/1993 | Japan |
| 5-194887 | 8/1993 | Japan |
| 5-255626 | 10/1993 | Japan |
| 6-057644 | 3/1994 | Japan |
| 2204589 | 11/1988 | United Kingdom |

*Primary Examiner*—Margaret Einsmann
*Attorney, Agent, or Firm*—Finnegan, Henderson, Farbow, Garrett & Dunner, L.L.P.

[57] ABSTRACT

Ink for ink-jet dyeing purposes contains a disperse dye which is insoluble, or slightly soluble, in water, and a dispersing agent which can be represented by the following general formula (I).

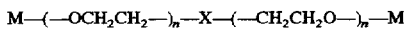

$$M-(-OCH_2CH_2-)_n-X-(-CH_2CH_2O-)_n-M$$

Here, X in this formula represents —A— or —O—A—O— (where A is represented by the formulae indicated below), and M is a hydrogen atom, —SO$_3$H, —SO$_3$NH$_4$ or —SO$_3$Na, and n is an integer of value 5–20.

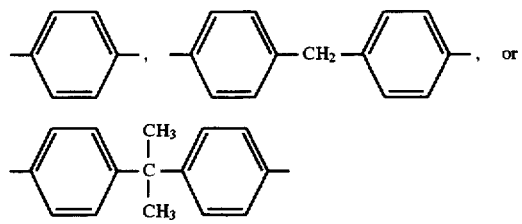

According to the above ink, there is no blockage of the orifices by the ink and the ink can be discharged from the orifices in the form of very fine liquid droplets which are stable, and mixing of the inks which have be discharged on the surface of the said cloth proceeds smoothly, thereby enabling to obtain uniform and distinct images with no physical defects or color defects.

Another aspect is directed to a method of forming mixing color on a material to be dyed. According to this method, the mixing color is obtained by mixing a first ink for ink-jet dyeing with a second ink for ink-jet dyeing having a color which is different from that of the first ink on the material to be dyed, wherein the first and second inks contain water, dispersing dye which is insoluble or slightly soluble in water and dispersing agent which can be represented by the above general formula (I).

13 Claims, No Drawings

INK FOR INK-JET DYEING AND METHOD OF FORMING MIXING COLOR

This is a continuation of application Ser. No. 08/348,832, filed Nov. 29, 1994.

BACKGROUND OF THE INVENTION

1. Field of the Invention

This invention relates to ink for ink-jet dyeing and, more particularly to ink for ink-jet dyeing purposes in which a specified dispersing agent is used as a dispersing agent for a disperse dye which is insoluble or slightly soluble in water and method of forming mixing colour by using the ink.

2. Description of the Prior Art

Ink-jet dyeing has been adopted as a means of dyeing cloth in recent years.

Ink-jet dyeing is a technique in which dyeing is achieved by dispersing very fine liquid droplets of dye ink onto the cloth surface from a discharge orifice; printing points, lines or patterns, for example, onto the cloth surface; then, after printing, colouring and fixing the discharged dye by drying or heating with moist heat; and finally removing the unfixed dye.

The best dye inks for use in ink-jet printing are selected according to the material which is to be dyed.

Recently, there is a very great demand for products made of the polyester and polyacetate materials. For dyeing these materials, dye inks in which disperse dyes are used are mainly employed.

Disperse dyes, apart from those which are used by being solved in organic solvents, are generally used in the form of a dispersion in which water is used as the principal medium.

In those cases where a cloth is dyed using such dye ink in which a disperse dye which uses water as the principal medium is employed, there is a disadvantage in that blockage of the discharge orifice, that is to say the nozzle, is liable to occur.

Such nozzle blockage results in the discharge of very fine liquid droplets which are being scattered unevenly when printing on the cloth, thus leading to a troublesome fault when producing products. Furthermore, since the nozzle blockage also reduces productivity, it must be avoided.

Since such blockage is greatly affected by the stability of the dye ink, it is important that a fairly stable dye ink should be used.

The three conditions of stable particle size, suitable viscosity and a high degree of dispersion must be satisfied in order to secure stability for dye ink.

However, no ink which satisfies satisfactorily such conditions and contains disperse dye which uses water as the principal medium has yet been developed.

On the other hand, in those cases where a cloth is dyed with a dye ink in which a disperse dye which uses water as the principal medium is used, there is a case that considerable bleeding occurs in the warp direction, the weft direction and the thickness direction of the cloth, thus resulting in difficulty in obtaining a sharp pattern. This is because in the case of a cloth, unlike paper, the threads or the woven or knitted fibers which form the cloth have a strong directionality, and they have irregular voids on a microscale.

Consequently, importance has been placed on measures for preventing bleeding, and as a result, techniques in which a so-called ink retaining layer is pre-coated onto the cloth surface, as disclosed in Laid-open Japanese Patent No. 61-55277, for example, have been developed.

This is a method in which bleeding is prevented by forming an ink retaining layer on the cloth surface by means of a compound, consisting of at least one type of water dispersible polymer, water soluble salts and water insoluble inorganic particles which are essentially non-dyeable with the dye, and temporarily retaining the dye ink droplets which have been discharged and printed on the ink retaining layer.

However, although the intended purpose is realized with this method, a major problem still remains in respect to the smooth mixing of the individual printed ink droplets which is an essential condition for obtaining a uniform and distinct image.

That is to say, the printed ink droplets are retained more or less as they are by the ink retaining layer when ink-jet printing is carried out using an ink of the conventional composition on an ink retaining layer which has been formed on the surface of a cloth. As a result, because dispersion of the ink which is primarily required is also suppressed, there is virtually no smooth mixing of the individual liquid ink droplets which is an essential requirement for obtaining a uniform and sharp image.

Consequently, the irregularity in the state of the ink retention which is produced on the ink retaining layer at the time of printing remains as a dyeing difference, which results in physical disadvantages such as the development of streak and moire patterns for example, and colour defects such as colour break-up and colour differences.

Therefore, hereinbelow, a brief explanation will be made with reference to the need for achieving smooth mixing for the case of Shiriasu scanning type ink-jet printing apparatus which is being used in the main at the present time.

In the Shiriasu scanning type apparatus, the nozzle head is held at a fixed distance from the cloth and the head is moved with a reciprocating motion in the weft direction (main scanning direction) while ink is being discharged, to carry out printing operation. This apparatus has the advantages of high printing accuracy and miniaturization.

There is no problem with this apparatus if the number of heads is Just the number of colours used in the pattern but, in view of the physical limits on the location of the heads, it is not possible to provide a number of heads corresponding to all colours.

Hence, only the three primary coloured inks, namely yellow ink, blue ink and red ink, are discharged from the head, and other colours are provided by the subtractive colour mixing of these three colours.

Now, in a case where a green colour is to be produced on the cloth surface by moving the yellow ink nozzle head and the blue ink nozzle head with a reciprocating motion in the weft direction as described above and discharging ink from each of these heads, when the heads are moving from the right edge to the left edge the yellow ink is discharged first from the leading head onto the cloth surface and then blue ink is discharged from the following head.

However, when the heads are moving in the opposite direction, that is from the left edge to the right edge, the order of the discharges is reversed and the blue ink is discharged first from the leading head and then the yellow ink is discharged over this from the following head.

Hence, blue ink is sometimes discharged on top of the yellow ink, and yellow ink is sometimes discharged on top of the blue ink, depending on the direction in which the heads are moving, thus leading to a difference in the mixing conditions of the inks on the cloth surface.

The ink jet printing system generally involves a colour mixing method of this type for colour realization. Therefore, if the ink which is discharged from the orifice is retained on a retaining layer without adequate mixing, the fine liquid droplets of yellow ink and blue ink which have been discharged under the different conditions indicated above will be fixed onto the cloth surface as they are with an imperfect mixing.

Consequently, not only a uniform and clear pattern can not be obtained but also, as mentioned earlier, physical disadvantages such as colour failure of the types described above will arise. Hence, in the ink jet printing system, smooth mixing of the inks which have been printed on the material which is to be printed is essential.

As well as requiring smooth mixing of the inks as described above, it is also essential that fine liquid droplets which have stability should be discharged when discharging an ink from a very small orifice. In order to discharge such stable very fine liquid droplets of ink, stable viscosity, particle size and sufficient dispersion rate must be established.

SUMMARY OF THE INVENTION

The object of the present invention is to provide disperse dye inks for ink-jet dyeing purposes which, by maintaining a fine particle size and suitable viscosity, do not cause blockage when they are discharged from a very small orifice, with which very fine liquid droplets which have stability are discharged from the orifice, and with which the discharged liquid ink droplets mix smoothly on the printed material, thereby enabling uniform and clear images with no physical defects or colour defects to be obtained.

Thus, as a result of thorough research based on an understanding of the above situation, the inventors have discovered that by using certain specified substances as dispersing agents it is possible to discharge very fine liquid droplets which have stability and that the discharged liquid ink droplets undergo mixing smoothly on the printed material. This invention has been made based upon this discovery.

That is to say, this present invention is directed to an ink for ink-jet dyeing which contains a disperse dye which is insoluble, or slightly soluble, in water, and a dispersing agent which can be represented by the general formula (I) indicated below.

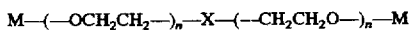

Here, X in this formula represents —A— or —O—A—O— (where A is represented by the formulae indicated below), and M is a hydrogen atom, —SO$_3$H, —SO$_3$NH$_4$ or —SO$_3$Na, and n is an integer of value 5-20.
(where A is)

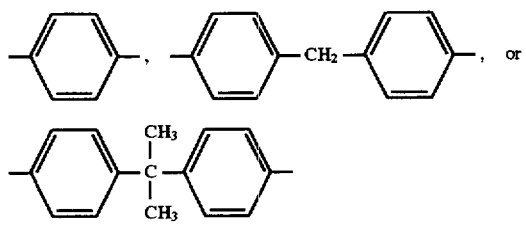

In the present invention, it is preferable to use at least two types of the dispersing agent which can be represented by the aforementioned general formula (I).

Preferably, the ink contains the dispersing agent in an amount of 0.1–20 % by weight.

Preferably, the ink contains the disperse dye in an amount of 0.1–30 % by weight.

In the present invention, it is also preferable that the particle size of the dispersing dye is 0.05 μm–0.3 μm.

Further, it is also preferable that the viscosity of the ink is 1.5 CPS–4.5 CPS (calculated at 25° C.)

Another aspect of the present invention is directed to a method of forming mixing colour on a material to be dyed. The mixing colour according to this method is obtained by mixing a first ink for ink-jet dyeing with a second ink for ink-jet dyeing having a colour which is different from that of the first ink on the material to be dyed, wherein the first and second inks contain water, dispersing dye which is insoluble or slightly soluble in water and dispersing agent which can be represented by the above general formula (I).

Another aspect of the present invention is also directed to a method of forming mixing colour. This method includes a first step for applying a first ink for ink-jet dyeing and a second ink for ink-jet dyeing having a colour which is different from that of the first ink onto a material to be dyed in this order, and a second step for applying the first ink and the second ink onto the material to be dyed in the reverse order to the first step, thereby obtaining a mixing colour formed from the first and second inks by carrying out the first and second steps, wherein the first and second inks contain water, a dispersing dye which is insoluble or slightly soluble in water and a dispersing agent which can be represented by the above formula (I).

In these methods, it is preferable to use an ink-jet printing apparatus having a first nozzle head and a second nozzle head which can be reciprocally moved in its main scanning direction, and the first and second inks are jetted to the material to be dyed from the first and second nozzles, respectively.

DETAILED DESCRIPTION OF THE INVENTION

In the conventional inks for ink-jet dyeing purposes which belong to the technical field of the present invention, dispersing agents for dispersing disperse dye are added therein. In the past, it has been necessary to select and use the most suitable dispersing agent, depending on the type and characteristics of the disperse dye.

In contrast with this, the dispersing agents represented by general formula (I) according to the present invention have the advantage that they can be used for virtually all disperse dyes, and enjoy the excellent effect described below.

Specifically, in the present invention, by selecting the atoms and functional groups which are specified for X and M in the dispersing agents of the general formula (I), non-ionic compounds and anionic compounds are obtained, and one type, or combinations of two or more types, from among these materials can be used.

For example, the following dispersing agents (1)–(4) can be obtained on specifying X and M in a compound of general formula (I).

[Dispersing agent (1)]

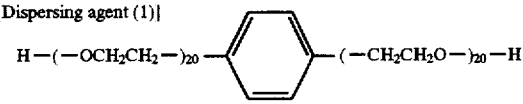

[Dispersing agent (2)]

[Dispersing agent (3)]

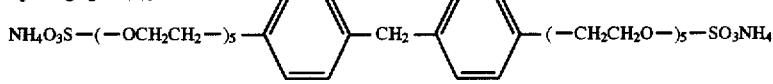

[Dispersing agent (4)]

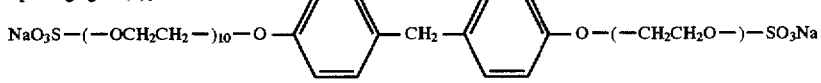

These dispersing agents (1) to (4) are mentioned as a preferred example of dispersing agents to be used. It should be noted that dispersing agents which can be used in the present invention are not limited to these agents. Further, it should also be noted that in the present invention it is possible to use derivatives of the materials which can be represented by the above general formula (I).

In this case, these dispersing agents which can be used in this invention must have molecular weight less than 2000.

The amount of the dispersing agent (or the total amount when two or more types of the dispersing agents are used) in the ink is determined appropriately on the basis of the compositions of the agent, or the types, characteristics, particle sizes or amounts of the agents to be combined. In general, it is preferable that the dispersing agent (or dispersing agents) is contained in the ink in an amount of 0.1%–20% by weight, and more preferably in an amount of 0.5%–10% by weight. In this case, if the amount of the dispersing agent is less than 0.1%, there is a case that the dispersing rate is reduced and smooth mixing is not carried out on the material to be dyed. Further, if the amount of the dispersing agent exceeds 20%, results will be no longer improved while the manufacturing cost of the ink is increased.

Further, with regard to the added amount of the dispersing agent with respect to the disperse dye which is included in the ink, it is preferable that an amount of the dispersing agent within the range of 50%–500% by weight is generally used, and more preferably an amount within the range of 50%–200% by weight is used.

As the dispersing dyes which can be used in the ink of the present invention, various dispersing dyes (pigments) can be use if they are insoluble or slightly soluble in water which is an essential property required for the dyes. Examples of these disperse dyes include anthraquinone-based disperse dyes, azo-based disperse dyes, quninophthalone-based disperse dyes, methion-based disperse dyes and condensed heterocyclic-based disperse dyes, and the like. Colours of the disperse dyes are also not limited, and virtually all the colours indicated in the colour index can be used.

The average particle size of the disperse dyes are also not limited to a specific size, but it is preferable to have the average particle size of 0.05 µm–0.3 µm, and more preferable to have the average particle size of 0.05 µm–0.2 µm.

If the average particle size is less than 0.05 µm, not only there is no practical merit, but also there is disadvantage that the manufacturing cost increases due to the high technical level required for the manufacturing process thereof.

On the other hand, if the average particle size exceeds 0.3 mµ, blockage is liable to occur at the nozzle orifice from which the ink is discharged, depending on the conditions such as the added amount of the disperse dye, the viscosity of the ink or the like.

The average size of such a dye is obtained by pulverizing a dispersing dye using a fine particle pulverizing machine such as a sand grinder or a paint conditioner for example, and then adjusting into the above-mentioned size. These disperse dyes can be used with the cake from the manufacturing process in a wet or dry state, or they may be used after refinement and measurement of concentration thereof.

As dispersing medium for use in the ink of the present invention, water can be cited. Further, in addition to the water, it is also possible to use auxiliary solvents. As the auxiliary solvents, organic solvents which are compatible with water can be cited. Examples of these organic solvents include alcohols such as methyl alcohol, ethyl alcohol, propyl alcohol, diethylene glycol and glycerine, and the like.

In addition, the ink of the present invention may contain various additives such as preservatives, anti-oxidants, anti-foaming agents, viscosity adjusting agents or the like depending on the purpose of each additive.

Examples of the preservatives include imidazole-based preservatives such as 2-(4-thiazolyl) benzimidazole and 2-benzimidazole carbamic acid methyl ester, thiazole-based preservatives such as 1,2-benzisothiazolin-3-one and 2-n-octyl-isothiazolin-3-one, iodine-based preservatives, nitrile-based preservatives, phenol-based preservatives, haloalkylthio-based preservatives, pyridine-based preservatives, triazine-based preservatives and bromine-based preservatives.

Examples of the anti-foaming agents include silicon-based anti-foaming agents such as polyether modified silicones, pluronic type anti-foaming agents comprised of pluronic type ethylene oxide lower molecular weight adducts, and alcohol-based anti-foaming agents such as 2-ethylhexanol and the like.

These various additives can be added into the ink to such an extent that the effect of the present invention described below is not prevented, and the total added amount of these additives is generally less than 1% by weight.

The viscosity of the ink according to the present invention is also not limited to a specific value. However, it is preferable that the viscosity of the ink when used is 1.2 CPS–6.0 CPS (calculated at 25° C.), and more preferably 1.5 CPS–4.5 CPS (calculated at 25° C.).

If the viscosity of the ink is less than 1.2 CPS (calculated at 25° C.), a number of fine liquid droplets is generated and they are scattered when the ink is discharged from the nozzle.

On the other hand, if the viscosity of the ink is greater than 6.0 CPS (calculated at 25° C.), a blockage is liable to occur at a nozzle orifice when a diameter thereof is relatively small.

The above described ink according to the present invention is manufactured in accordance with the following process, for instance.

(1) Pulverizing the dye and the dispersing agent into particles of approximate 100 µm–200 µm by using a preliminary dispersing machine.

(2) Adjusting thus obtained particles into a predetermined particle size by using another dispersing machine.

(3) Adjusting the concentration by adding water or solvent, and at this time, adding desired various additives.

Thus manufactured ink of the present invention has properties in which excellent stability can be secured.

In particular, if the ink according to the present invention is used when mixing colour is to be produced on a printed material by mixing a first ink for ink-jet dyeing (hereinafter, referred to as "first ink") and a second ink for ink-jet dyeing having a colour different from that of the first ink (hereinafter, referred to as "second ink"), the effect of the invention described below is realized. In this case, if both of the first and second inks are formed from the ink according to the present invention, the following effect of the invention becomes more clear.

For example, when mixing colour is formed on a cloth-like printed material, a first step in which the first ink and the second ink are applied onto the material in this order is carried out. Next, a second step in which the first ink and the second ink are applied onto the material in the reverse order is carried out. Then, the first and second steps are repeated one after another.

In more detail, by using an apparatus having a first nozzle head with a first nozzle and a second nozzle head with a second nozzle which are provided so as to be moved reciprocally in the main scanning direction and are arranged along the main scanning direction, the first and second inks are discharged toward the printed material from the first and second nozzles, respectively. When the nozzle heads are moved in the forward direction, the first ink which has been discharged from the first nozzle is applied onto a predetermined position on the first main scanning line on the printed material, and then the second ink which has been discharged from the second nozzle is applied over the first ink on the same position, and both of the inks being mixed. When the nozzle heads are moved in the opposite direction, the second ink which has been discharged from the second nozzle is first applied onto a predetermined position on the second main scanning line on the printed material which is adjacent to the first main scanning line, and then the first ink which has been discharged from the first nozzle is applied over the second ink on the same position, and both of the inks being mixed.

In this case, since the mixing of the first and second inks is carried out smoothly irrespective of the order of the application thereof, there is no nonuniformity between the mixing colours formed by the first step in which the nozzle heads are moved in the forward direction and by the second step in which the nozzle heads are moved in the opposite direction, thereby enabling to obtain a uniform and distinct printed image.

In this regard, it should be noted that in a case where both of the first and second inks are formed of the inks for ink-jet dyeing according to the present invention, composition and added amount of the dispersing agent, particle size, added amount and dispersing rate of the dispersing dye, viscosity of the ink, and kinds of used additives may be the same in these inks or may be changed in the respective inks.

Combination of colours of the first and second inks are also not limited to a specific combination. For example, any two colours selected from the group including three primary colours, white and black can be used as the first and second inks.

The diameter of the nozzle orifice of each of the first and second nozzles is not limited to a specific size. However, it is preferable that the diameter is within the range of 10 µm–120 µm, and more preferably 40 µm–100 µm.

Materials to be printed on which a print is formed by the above method of the present invention are not limited to a specific material if it has water absorptive property. Examples of such materials include woven fabric, knitted fabric, non-woven fabric, paper and leather and the like. Among these materials, the effect of the invention is more distinctly realized when woven fabric or knitted fabric is used as the printed material. Further, the woven fabric or the knit fabric can be formed from either of natural fibers or synthetic fibers or mixed fibers.

Hereinafter, the present invention will be described in more practical terms with reference to the examples, but it should be noted that the invention is not limited by these examples.

EXAMPLES

The methods of testing the various properties, and the methods of evaluating the uniformity and distinctness of the images on the cloth which had been dyed in the examples and comparative examples were as described below.

Methods of Testing and Evaluation (1) Viscosity

The viscosity was measured using the apparatus described below.

Apparatus: BL type viscometer, (made by the Tokyo Keiki Manufacturing Co., Ltd.)

Measuring Temperature: 25° C.

Rotor Used : No1 Type Rotor Rotation Rate: 60 rpm (2) Particle Size

The particle size was measured using the apparatus described below.

Apparatus: Sub-micron Particle Analyzer N-4 (Made by the Coultersr Co. Ltd.)

Measured Particle Range: 0.003 µm–3 µm (3) Dispersion Factor

Ink was transferred to a 100 ml measuring cylinder and left to stand at room temperature for 7 days and then 10 ml was collected from the top of the cylinder and 10 ml was collected from the bottom.

The absorbance at λmax of each of the aqueous dye solution samples collected was measured.

Then, the aqueous dispersion factor was calculated using the following equation.

(Absorbance of Upper Aqueous Dye Solution / Absorbance of Lower Aqueous Dye Solution)×100=Aqueous Dispersion Factor (%)

(4) Printing Characteristics

Using ten nozzles of diameter 100 μm, units of 50 m were printed continuously across a width of 40 inches onto a cloth of width 44 inches with each nozzle (5 m per each nozzle) using ink-jet dyeing as indicated below, and the following points were noted:

(a) Blockage around the nozzles, and
(b) The quality of the surface which had been ink-jet dyed, which was determined as follows:
  (i) The following items were observed and assessed visually:
    Form Defects : Streaks, Moire
    Colour Defects: Colour break-up, Colour differences
  (ii) The dyed cloth was subjected to a dye colour fixing process with a moist heat treatment at 175° C. for 8 minutes and then it was subjected to a reduction washing treatment and dried, and the uniformity of the colour of the dyed part was observed and assessed.

Ink Preparation

The inks A, B, C and D for the inks used in Example 1 and Example 2, and the inks a, b, c and d for the inks used in the comparative examples, were prepared according to the formulations shown in Table 1 and Table 2 attached to the last of the specification.

The dispersing agents (I)–(IV) in Table 1 were compounds which had the formulae (i)–(iv) indicated below.

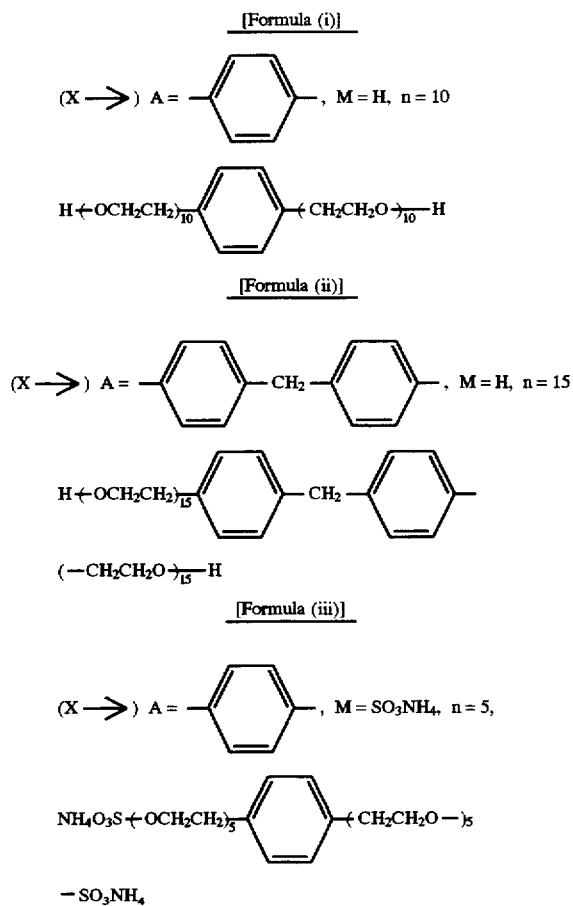

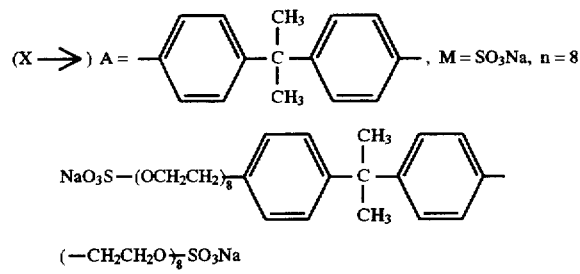

Ink Jet Printing Procedure

Using on-demand type Shiriasu scanning type ink-jet printing apparatus, printing was carried out by discharging ink in 50 m units in the warp direction in a whole-surface pattern over a width of 40 inches, as indicated below, on a 44 inch taffeta surface for which 75 d polyester threads had been used for the warp and weft threads, with 100 μam nozzles, a drive voltage of 107 V, a frequency of 5 kHz and a resolution of 180 dots/inch. (In the comparative examples, it was not possible to discharge the ink continuously for 50 m.) First of all, an assessment of the quality of individual inks was made by printing with single inks, and then, as in Example 1 and Example 2, the ink A was discharged and then the ink B was discharged in the same region and the two inks were discharged over one another.

In this case, the nozzle heads are reciprocally moved. With regard to the Example 1, when the nozzle heads are moved in the forward direction, the ink A was first discharged and then the ink B was discharged over the ink A on the same printing position to carry out the printing operation. Further, when the nozzle head was moved in the opposite direction, the order of discharging the inks was reversed, that is the ink B was first discharged and then the ink A was discharged over the ink B on the same printing position. With regard to the Example 2, when the nozzle heads were moved in the forward direction, the ink C and ink D were discharged in this order, and when the nozzle heads were moved in the opposite direction, the ink D and ink C were discharged in this order, to carry out the printing operation.

After printing, the materials were dried and compared. (However, in Comparative Example 1 and Comparative Example 2 the printing with the individual inks was impossible.)

Post Treatments such as Colour Formation and Fixing

Next, dye colour formation and fixing were carried out by means of a moist heat treatment at 175° C. for 8 minutes and then the materials were subjected to a reduction washing process.

The results obtained in the examples and comparative examples carried out in the ways described above are shown in Tables 3–6 attached to the last of the specification.

Effect of the Invention

In those cases where a cloth comprised of polyester fibres, acetate fibres, triacetate fibres etc. is dyed with an ink-jet printing system using inks of the present invention, blockage of the orifices by the ink does not occur and ink can be discharged from the orifices in the form of very fine liquid droplets which are stable and, moreover, the mixing of inks which have been discharged onto the surface of the said cloth takes place very smoothly, thereby enabling to obtain uniform and distinct images which have no physical defects or colour defects.

Finally, it should be noted that the present invention is no limited to the above-mentioned examples. The scope of the invention will be determined on the basis of the attached claims.

TABLE 1

(Ink composition)

(unit: % by weight)

| Example | | Example 1 | | Example 2 | |
|---|---|---|---|---|---|
| Ink composition | Ink Name | A | B | C | D |
| Dye Cake I | CI Disperse Blue 60 | 3 | | 3 | |
| Dye Cake II | CI Disperse Red 60 | | 4 | | 4 |
| Dispersing Agent I | Formula (i) | | 4 | 6 | |
| Dispersing Agent II | Formula (ii) | 6 | | | 4 |
| Dispersing Agent III | Formula (iii) | | | | 0.5 |
| Dispersing Agent IV | Formula (iv) | | | 3 | |
| Anti-foaming Agent | Safinooru 104 (produced by Nisshin Chemical Co., Ltd.) | 0.05 | 0.05 | 0.05 | 0.05 |
| Dispersing Medium | Water | Remainder | Remainder | Remainder | Remainder |
| Total | | 100 | 100 | 100 | 100 |

TABLE 2

(Ink composition)

(unit: % by weight)

Comparative Example

| Ink composition | Ink name | Comparative Example 1 | | Comparative Example 2 | |
|---|---|---|---|---|---|
| | | a | b | c | d |
| Dye Cake I | CI Disperse Blue 60 | 3 | | 3 | |
| Dye Cake II | CI Disperse Red 60 | | 4 | | 4 |
| Surfactant Agent I (Note: 1) | Non-ionic Surfactant if the Formula Indicated Below (produced by Matsumoto Yushi Co., Ltd.) | 6 | | 6 | 4 |
| Surfactant Agent II (Note: 2) | Anionic Surfactant of the Formula Indicated Below (produced by Matsumoto Yushi Co., Ltd.) | | 4 | 2 | 4 |
| Anti-foaming Agent | Safinooru 104B (produced by Nisshin Chemical Co., Ltd.) | 0.05 | 0.05 | 0.05 | 0.05 |
| Dispersing Medium | Water | Remainder | Remainder | Remainder | Remainder |
| | Total | 100 | 100 | 100 | 100 |

Note:
(1) Surfactant Agent I

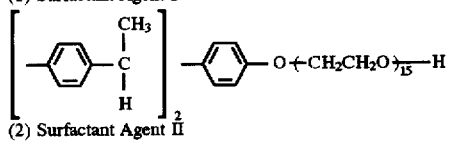

(2) Surfactant Agent II $$NaO_3S-\bigcirc\bigcirc-CH_2-\bigcirc\bigcirc-SO_3Na$$

TABLE 3

(Results of Example 1)

| | Example 1 | |
|---|---|---|
| | A | B |
| Ink Properties | | |
| Viscosity (CPS) | 2.1 | 1.8 |
| Particle Size (μm) | 0.15 | 0.13 |
| Dispersion Factor (%) | 99 | 99 |
| Printing Evaluation | | |
| Occurrence of Nozzle Blockage | No blockage with 10 nozzles for 100 m printing | No blockage with 10 nozzles for 50 m printing |
| Quality of Printed Product | No streaks or moire formation, and no colour break-up or colour difference at all | Same as A |
| Quality of Finished Productce | The dyed part was dyed into a uniform and distinct green colour | Same as A |

TABLE 4

(Results of Example 2)

| | Example 2 | |
|---|---|---|
| | C | D |
| Ink Properties | | |
| Viscosity (CPS) | 2.3 | 1.6 |
| Particle Size (μm) | 0.15 | 0.15 |
| Dispersion Factor (%) | 99 | 99 |
| Printing Evaluation | | |
| Occurrence of Nozzle Blockage | No blockage with 10 nozzles for 50 m printing | No blockage with 10 nozzles for 50 m printing |
| Quality of Printed Product | Same as A | Same as A |
| Quality of Finished Product | Same as A | Same as A |

TABLE 5

(Results of Control 1)

| | Comparative Example 1 | |
|---|---|---|
| | (a) | (b) |
| Ink Properties | | |
| Viscosity (CPS) | 2.5 | 1.9 |
| Particle Size (μ) | 0.2 | 0.18 |
| Dispersion Factor (%) | 80 | 63 |
| Printing Evaluation | | |
| Occurrence of Nozzle Blockage | Blockage with 1 nozzle on individual printing for 6 cm | Blockage with 10 nozzles on individual printing for 2 cm |
| Quality of Printed Product | Printing Impossible | Printing Impossible |
| Quality of Finished Product | Evaluation Impossible | Evaluation Impossible |

TABLE 6

(Results of Control 2)

| | Comparative Example 2 | |
|---|---|---|
| | (a) | (d) |
| Ink Properties | | |
| Viscosity (CPS) | 2.7 | 2.7 |
| Particle Size (μ) | 0.16 | 0.14 |
| Dispersion Factor (%) | 96 | 84 |
| Printing Evaluation | | |
| Occurrence of Nozzle Blockage | Blockage with 2 nozzles on individual printing for 15 cm | Blockage with 4 nozzles on individual printing for 26 cm |
| Quality of Printed Product | Printing Impossible | Printing Impossible |
| Quality of Finished Product | Evaluation Impossible | Evaluation Impossible |

What is claimed is:

1. An ink for ink-jet dyeing purposes comprising a) a disperse dye which is insoluble, or slightly soluble, in water; and b) a dispersing agent of the formula (I)

$$M-(-OCH_2CH_2-)_n-X-(-CH_2CH_2O-)_n-M \qquad (I)$$

wherein M is a hydrogen atom, $-SO_3H$, $-SO_3NH_4$, or $-SO_3Na$ radical, n is an integer ranging from 5-20, and X is a radical selected from the group consisting of

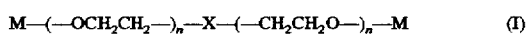

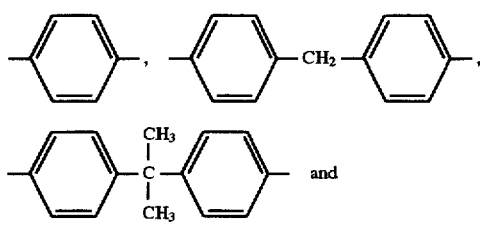

and

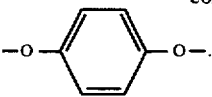

2. Ink for ink-jet dyeing purposes according to claim 1, wherein at least two types of said dispersing agent are used.

3. Ink for ink-jet dyeing purposes according to claim 1, wherein said ink contains said dispersing agent in an amount of 0.1-20 % by weight.

4. Ink for ink-jet dyeing purposes according to claim 3, wherein said ink contains said disperse dye in an amount of 0.1-30 % by weight.

5. Ink for ink-jet dyeing purposes according to claim 1, wherein the average particle size of said disperse dye is 0.05 μm–0.3 μm.

6. Ink for ink-jet dyeing purposes according to claim 1, wherein the viscosity of the ink is 1.5 CPS–4.5 CPS (calculated at 25° C.).

7. Ink for ink-jet dyeing purposes according to claim 1 wherein the amount of said dispersing agent ranges from 0.5 to 10% by weight.

8. Ink for ink-jet dyeing purposes according to claim 1 wherein the amount of said disperse dye ranges from 0.25 to 10% by weight.

9. An ink for ink-jet dyeing purposes comprising:

a) a disperse dye which is insoluble, or slightly soluble, in water; and b) about 3 to 10 wt % of a dispersing agent of the formula (II):

$$M-(-OCH_2CH_2-)_n-X-(-CH_2CH_2O-)_n-M \qquad (II)$$

wherein M is $-SO_3H$, $-SO_3NH_4$, or $-SO_3Na$ radical, n is an integer ranging from 5–20, and X is a radical selected from the group consisting of

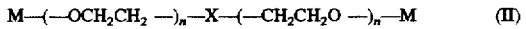

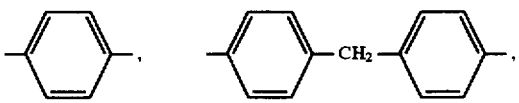

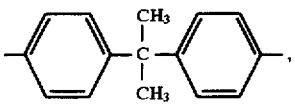

and

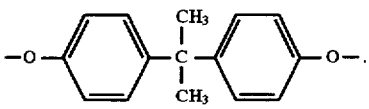

10. The ink for ink-jet dyeing purposes according to claim 9 wherein the amount of the dispersing agent present is 50–500 wt % of the amount of disperse dye contained in the ink composition.

11. The ink for ink-jet dyeing purposes according to claim 9, comprising at least two types of the dispersing agent.

12. The ink for ink-jet dyeing purposes according to claim 9, wherein the average particle size of the disperse dye is about 0.05 μm to about 0.3 μm.

13. The ink for ink-jet dyeing purposes according to claim 9, wherein the viscosity of the ink is about 1.5 CPS to about 4.5 CPS.

* * * * *